PRIVACY COMMUNICATION SYSTEM

Filed April 12, 1944 2 Sheets-Sheet 1

INVENTOR
D. K. GANNETT
BY
Earl C. Laughlin
ATTORNEY

INVENTOR
D. K. GANNETT
BY
Earl C. Laughlin
ATTORNEY

United States Patent Office 3,201,517
Patented Aug. 17, 1965

3,201,517
PRIVACY COMMUNICATION SYSTEM
Danforth K. Gannett, Mountain Lakes, N.J., assignor to Bell Telephone Laboratories, Incorporated, New York, N.Y., a corporation of New York
Filed Apr. 12, 1944, Ser. No. 530,636
5 Claims. (Cl. 179—1.5)

The invention relates to communication systems, and particularly to arrangements for use with such systems to provide privacy of the transmitted communications.

Where a communication system is employed for transmitting messages of a confidential nature, it is desirable to provide at each terminal station suitable equipment for transforming the message waves to an unintelligible form before transmitting them over the transmission medium connecting the stations in order to prevent or delay unauthorized persons equipped with receiving apparatus suitable for picking up the transmitted waves in obtaining an understanding of their intelligence, and other equipment for reproducing the original messages from the unintelligible waves received over the transmission medium from another station. The cost and complexity of such privacy equipment will depend upon the degree of privacy desired. It is known that the attainment of a fairly high degree of privacy, for example, such that a number of hours would be needed by a well-equipped expert crew, unacquainted with the privacy scheme used, to decipher the transmitted intelligence, requires relatively complicated circuit arrangements and a quantity of apparatus which may have relatively large combined weight and space requirements. Such equipment is usually too costly and cumbersome for general use.

The present invention is primarily concerned with simpler equipment for providing a lesser degree of privacy, for example, such as to delay an eavesdropper in obtaining an understanding of the transmitted communications for a shorter time interval, for general use in communication systems where low cost and small weight and size of the privacy equipment are essential. Examples of such systems are those for providing radio telephone communication between airplanes, between airplanes and ground stations, between boats, or between boats and shore stations.

An object of the invention is to improve privacy arrangements of the latter type, particularly from the standpoint of simplicity, flexibility and reduction in cost for a given degree of privacy.

A related object is to obtain an appreciable degree of privacy in message transmission over a communication system, for example, a telephone system, with the addition of a comparatively small amount of inexpensive equipment having small weight and small space requirements.

These objects are attained in accordance with the invention by employing at the terminals of the communication system, in association with the transmitting and receiving communication circuits for each direction of transmission, substantially identical privacy devices each employing a small number of filters and frequency shifting circuits (modulators with associated carrier sources) connected in a simple circuit arrangement, for respectively transforming an intelligible message of a band of frequencies to a secret coded unintelligible "reentrant band" for transmission over the transmission medium connecting the stations, and for reproducing the original message from the incoming unintelligible "reentrant band."

A "reentrant band" is similar in all respects to the message frequency band from which it is derived except that the frequencies have been shifted within the band.

For example, if all the frequencies in a 0–3000 cycle voice band were shifted upward 1000 cycles, they would then occupy the frequency range from 1000 to 4000 cycles. In the reentrant band, however, they still occupy the original 0 to 3000-cycle range. This means that the frequencies that would normally go above 3000 cycles, due to the frequency shift, appear in the vacant range created at the lower frequency end of the band. Thus in our example, frequencies from 0 to 2000 cycles would be shifted to 1000 to 3000 cycles, respectively, and frequencies from 2000 to 3000 cycles would appear as 0 to 1000 cycles, respectively. The term "reentrant band" means, then, that those frequencies forced out of the band at one end, due to the frequency shift, reenter at the other end. This frequency shift may be made to vary continuously or in steps over the frequency range employed and thus may be coded.

The privacy devices in accordance with the invention are preferably in the form of portable applique units adapted for ready connection to and operation with standard terminal communication apparatus, when privacy is desired, without any requirement for fundamental redesign or change in the latter, and for ready disconnection from the communication apparatus when privacy is not needed.

A feature of the invention is the use in association with each transmitting and receiving circuit at three or more stations of a two-way conference telephone system, of a privacy unit in accordance with the invention, utilizing properly selected frequencies for the carrier sources associated with the several modulators and properly selected frequency pass ranges for the several filters in the privacy units, such as to enable two-way telephone communication with a substantial amount of privacy between the several stations at the same frequencies.

The various objects and features of the inventoin will be better understood from the following detailed description when read in conjunction with the accompanying drawing in which.

Figure 1:
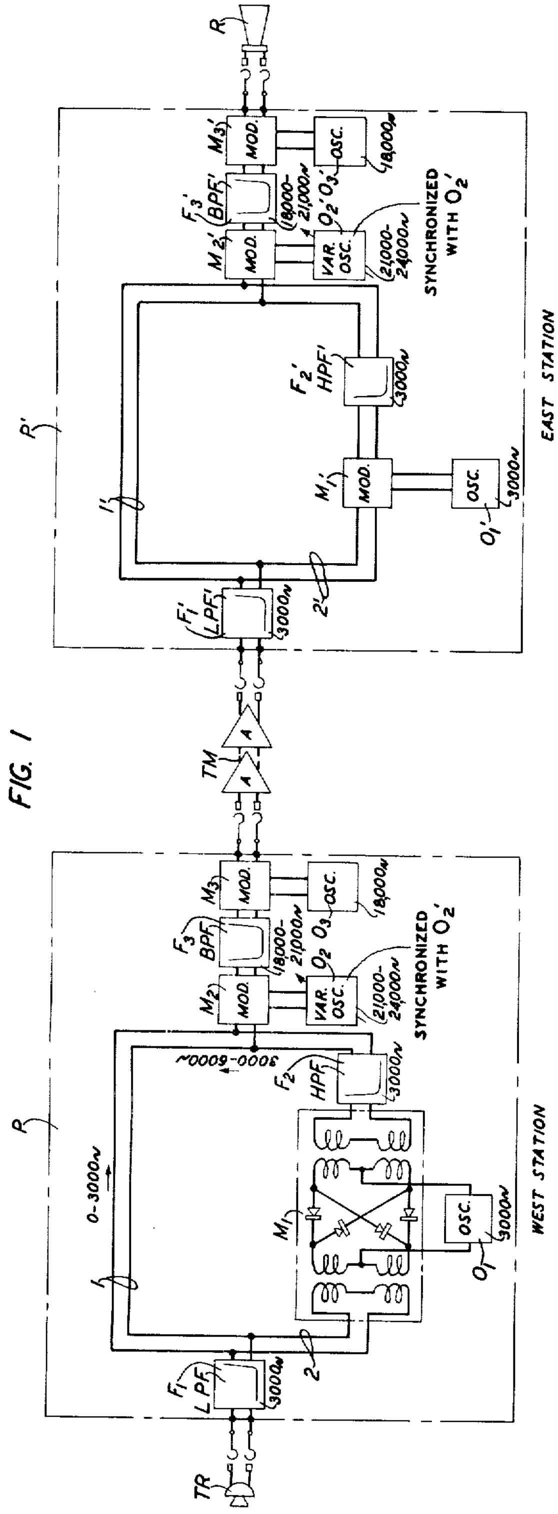
FIG. 1 shows schematically a portion of a telephone system embodying privacy arrangements in accordance with the invention.

In FIG. 1 one embodiment of the privacy system in accordance with the invention is shown applied to one direction of transmission in a telephone system. The telephone system includes a West telephone transmitting station and an East telephone receiving station connected by a transmission medium TM, which for simplicity has been illustrated as a wire telephone line including amplifiers A, but which may be a radio telephone link. The West transmitting station includes a telephone transmitter or microphone T and a privacy unit in accordance with the invention in the form of an applique unit, shown within the dot-dash box labeled P, having its input adapted for connection to or disconnection from the transmitter T, and its output adapted for connection to or disconnection from the input of the transmission medium TM. The East receiving station includes a privacy unit, shown within the dot-dash box labeled P', having its input adapted for connection to and disconnection from the output of the transmission medium TM and its output adapted for connection to and disconnection from the telephone receiver R.

In the embodiment of the invention illustrated, the privacy device P at the West transmitting station includes in its input a low-pass filter $F_1$ adapted to pass a restricted band of frequencies within the voice frequency range, 0 to 3,000 cycles per second, and two two-wire circuits 1 and 2 having their inputs connected in parallel to the output of the low-pass filter $F_1$. The two-wire circuit 1 does not include any transmission apparatus whereas the two-wire circuit 2 includes the modulator $M_1$ with an associated oscillator $O_1$ for supplying thereto a carrier wave of the constant frequency 3,000 cycles, and a following high-pass filter $F_2$ adapted to pass waves of frequencies above 3,000 cycles. The outputs of the two-wire circuits 1 and 2 are connected in parallel to the input of a second modulator $M_2$ with an associated variable frequency oscillator $O_2$ adapted to supply carrier waves of a frequency which is made to vary continuously or in steps over the frequency range, 21,000 to 24,000 cycles, in accordance with a predetermined secret code, which may be changed from time to time, by any suitable switching arrangement (not shown). A band-pass filter $F_3$ adapted to pass the frequency range 18,000 to 21,000 cycles is connected between the output of the modulator $M_2$ and the input of a third modulator $M_3$ having an associated oscillator $O_3$ supplying thereto a carrier wave of the constant frequency 18,000 cycles.

The privacy device P′ at the East receiving station includes apparatus substantially identical with that of the privacy device P at the transmitting station and connected in the same order, as indicated by the use of the same characters except that each is followed by a prime (′) mark, for identifying the corresponding elements.

The modulators $M_1$, $M_2$ and $M_3$ in the privacy device P at the West station and the corresponding modulators $M_1'$, $M_2'$ and $M_3'$ in the privacy device P′ at the East station may be of any suitable type, but are preferably of the double balanced copper-oxide rectifier type such as disclosed in Cowan Patent No. 2,025,158 issued December 24, 1935, adapted to suppress the unmodulated carrier and signal components as illustrated for the modulator $M_1$, mainly on account of its small size. Also, such a modulator is very stable when once adjusted and requires little, if any, maintenance. The variable frequency oscillators $O_2$, $O_2'$ in privacy device P and $O_2'$ in privacy device P′, may each comprise a single vacuum tube oscillator with means for varying its tuning, for example, such as disclosed in the Arnold et al. Patent No. 1,573,367 or the Kendall Patents Nos. 1,571,010 and 1,592,940 or may comprise a number of separate constant frequency oscillators of any suitable type generating different frequencies with switching arrangements for connecting them to the associated modulator $M_3$, $M_3'$ in the desired sequence. The constant frequency carrier oscillators $O_1$, $O_1'$, $O_3$ and $O_3'$, and the filters $F_1$, $F_2$, $F_3$ and $F_1'$, $F_2'$ and $F_3'$ may be of any suitable type.

Assuming that the privacy device P is "plugged in" so as to be connected in circuit between the telephone transmitter T and the input of the transmission medium TM at the West station, and the privacy device P′ is "plugged in" so as to be connected in circuit between the output of the transmission medium TM and the telephone receiver R, the system of FIG. 1 operates to provide transmission of a spoken message with a substantial amount of privacy from the West to East station as follows:

The transmitter T at the West station receives the spoken message and transforms it into electrical oscillations from which a restricted but intelligible frequency band of audible frequencies within the frequency range 0 to 3,000 cycles is selected by the low-pass filter $F_1$ in the input of the privacy device P. Equal energy portions of the selected 0 to 3,000-cycle band are impressed on the inputs of the parallel-connected branch circuits 1 and 2. The 0 to 3,000-cycle band impressed on circuit 1 is transmitted thereover to the input of modulator $M_2$ without frequency change, whereas the other 0 to 3,000-cycle frequency band impressed on branch circuit 2 is combined in modulator $M_1$ in that circuit with the 3,000-cycle oscillations from carrier oscillator $O_1$ to produce upper and lower sideband components of which the upper sideband, 3,000 to 6,000 cycles, is selected by the high-pass filter $F_2$ in the modulator output. Thus, the 0 to 3,000-cycle speech band in branch circuit 2 has been effectively shifted to a higher position, 3,000 to 6,000 cycles, in the frequency spectrum. The outputs of the circuits 1 and 2 are superposed in the input of modulator $M_2$ thereby supplying thereto two contiguous frequency bands of the same width, 0 to 3,000 cycles and 3,000 to 6,000 cycles, respectively, each carrying the intelligence of the original voice band. The combined 0 to 6,000-cycle band then modulates in the modulator $M_2$ with the carrier wave supplied from the associated oscillator $O_2$, varying in frequency over the frequency range extending from 21,000 to 24,000 cycles in accordance with the predetermined secret code, to produce upper and lower sideband products. The band-pass filter $F_3$ selects from the modulation products in the output of the modulator $M_2$ half of the lower sideband, comprising the frequency band, 18,000 to 21,000 cycles, which has the same width as the original message band selected by filter $F_1$. The selected band of frequencies is combined in the modulator $M_3$ with the constant frequency carrier wave of 18,000 cycles supplied from the associated oscillator $O_3$, resulting in the production of sideband products including a lower sideband of the frequencies 0 to 3,000 cycles, which is similar in all respects to the original 0 to 3,000-cycle voice band from which it was derived, except that the frequencies are shifted within the band and inverted. That sideband may be termed a "reentrant band" for those frequencies forced out of the band at one end, due to the frequency shifts, reenter at the other end. The sideband products in the output of modulator $M_3$ are impressed on the transmission medium TM and are transmitted over it toward the receiving station. If the medium TM is a transmission line, the frequencies of the upper sideband are so high that they are suppressed by the line.

At the receiving station, the received unintelligible lower sideband is selected by the 0 to 3,000-cycle low-pass filter $F_1'$ in the input of the privacy device P′ at that station and then is subjected by the following circuits and apparatus in that device, identical with those in the privacy device P at the transmitting station and connected in the same order, to similar energy dividing, filtering and frequency shifting operations resulting in the production in the output of the modulator $M_3'$ of privacy device P′ of the orginal voice band impressed on the privacy device P at the transmitting station, which is supplied to the telephone receiver R to reproduce the original voice message.

Figure 3:
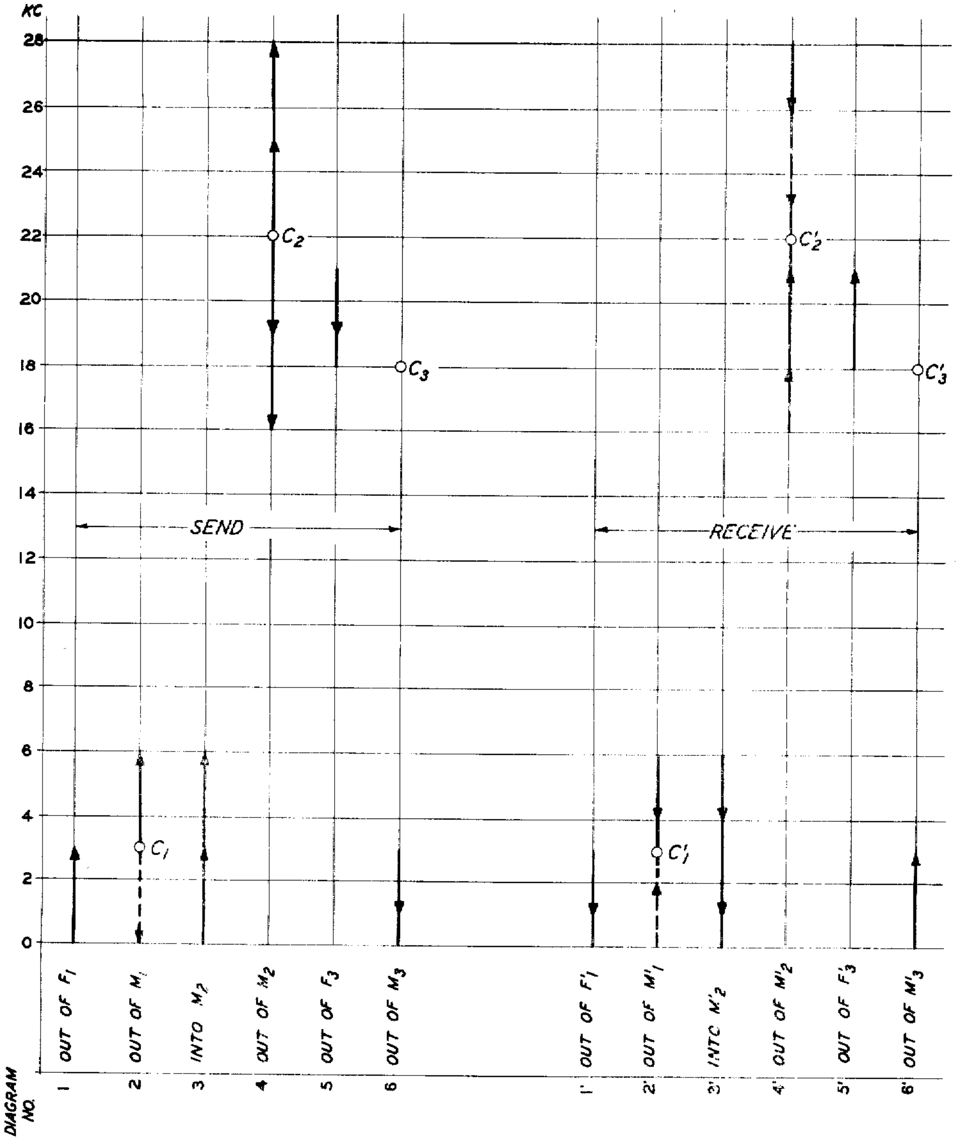
FIG. 3 shows a diagram illustrating the operation of the privacy arrangement of the invention at the transmitting and receiving stations in the telephone system of FIG. 1.

The performance of the privacy arrangement of the invention in the system of FIG. 1 is illustrated by FIG. 3 which shows the frequency transformations that occur by means of a succession of diagrams. In each diagram the arrows show the band of frequencies in the indicated part of the circuit, measured by the scale on the left. For example, diagram 1 shows the band of frequencies in the signal at the output of $F_1$. These frequencies extend from 0 to 3 kilocycles. Diagram 2 shows the upper and lower sidebands resulting from modulating this signal in $M_1$ on the 3,000 cycle carrier $C_1$ which is supplied by $O_1$. The heads of the arrows designate the ends of the bands corresponding to the 3,000 cycle end of the original signal band of diagram 1. The lower sideband is shown dotted since it is not transmitted by the filter $F_2$. The upper sideband is superposed on the original signal and applied to $M_2$ as shown by diagram 3. This signal is modulated in $M_2$ on the carrier $C_2$ furnished by $O_2$ giving the sidebands shown in diagram 4. For this diagram $C_2$ is assumed to be 22 kilocycles. It may at different times have values anywhere between 21 and 24 kilocycles.

The output of $M_2$ is impressed on $F_3$ which transmits that portion of the lower sideband lying between 18 and 21 kilocycles as shown by diagram 5. This is then modulated on the 18 kilocycles carrier $C_3$ furnished by $O_3$ and is thereby translated to the original frequency allocation lying between 0 and 3 kilocycles as shown in diagram 6. The upper sideband of this modulation process lies between 36 and 39 kilocycles and is not shown in the figure. It will be seen that the signal transmitted to the line shown by diagram 6 consists of the original signal inverted and reentered. The portion of the original signal lying between 1 and 3 kilocycles now appears inverted in the position between 3 and 1 kilocycles and the portion of the original signal lying between 0 and 1 kilocycles is inverted in the position between 1 and 0 kilocycle.

The same sequence of operations in the receiving circuit restores the original signal as shown by the second set of diagrams 1' to 6'. Diagrams 1' shows the signal received from the line at the output of $F_1'$. The effect of modulating this in $F_1'$ is shown by diagram 2'. The addition of the upper sideband of this modulation process and the original received signal is shown in diagram 3'. The resulting band of frequencies is applied to modulator $M_2'$ to which is supplied a carrier $C_2'$ which is the same frequency as the carrier $C_2$ at the sending end, resulting in the production of the frequency bands shown by diagram 4'. The portion lying between 18 and 21 kilocycles is transmitted through $F_3'$, the wave appearing in its output being indicated in diagram 5'. Finally this wave is modulated on the 18 kilocycle carrier $C_3'$ in $M_3'$, resulting in the signal indicated in diagram 6'. This is seen to be a copy of the original signal in the output of the filter $F_1$ at the sending end of the system as shown in diagram 1.

The oscillators in the privacy device P' at the receiving station of FIG. 1 must be synchronized with the corresponding oscillators in the privacy device P at the sending station, especially the variable oscillators $O_2$, $O_2'$, for satisfactory reproduction of the original voice band. Any of the known synchronizing schemes may be used. For example, test tones may be transmitted between the stations to give suitable information on the necessary phase adjustment of the oscillators which may be made manually or synchronizing pulses may be sent between the stations to control mechanism for making the adjustments automatically, for example, as disclosed in Kendall Patent No. 1,571,010.

The values of the carrier frequencies supplied to the several modulators and the 0 to 3,000 cycle voice band used in the system of FIG. 1 were selected arbitrarily to illustrate the general principles of operation in accordance with the invention. It is to be understood that any other carrier frequencies suitable for producing the required operation may be used and that these principles are applicable as well to systems of other types transmitting signal frequencies above the voice range.

Figure 2:
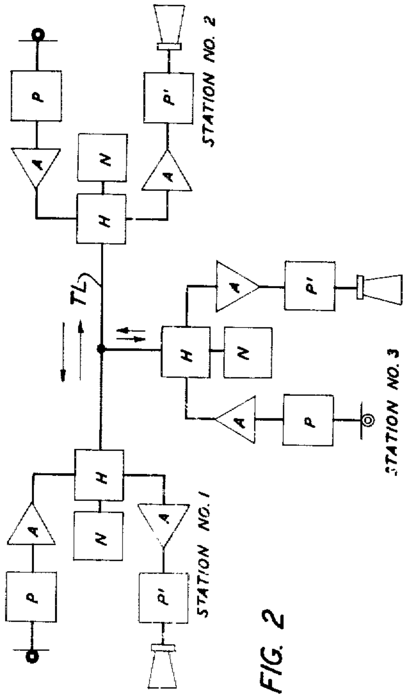
FIG. 2 shows diagrammatically a conference telephone system including privacy devices such as shown in detail in FIG. 1 in the transmitting and receiving circuits at each subscriber's station.

It will be noted in the embodiments of the invention illustrated in FIGS. 1 and 3 that by using a portion of the lower rather than the upper sideband of the output of modulator $M_2$, the circuits and carrier frequencies at the receiving station required to restore the signal are identical with those at the sending station. If the upper sideband were used, the carrier frequency $C_2'$ would have to be complementary to instead of identical with the carrier frequency $C_2$ at the sending station. Having the processes exactly the same at the sending and receiving stations makes the combination particularly adaptable for use in a conference telephone system such as illustrated diagrammatically in FIG. 2. In the conference system of FIG. 2, the privacy devices P and P' used in the microphone transmitting circuit and the loudspeaker voice receiving circuit, respectively, coupled to the common line TL by a hybrid coil H and associated balancing network N at each of the three stations No. 1 to No. 3 would utilize identical carrier frequencies for the modulators $M_2$ and $M_2'$, and identical carrier frequencies for the modulators $M_3$ and $M_3'$, as in the system of FIG. 1, thereby enabling two-way telephone communication with privacy at the same frequencies between any two of the stations with a minimum of equipment.

There are a number of other combinations of frequencies for the carrier oscillators associated with the modulators $M_2$ and $M_3$ which will result in the reproduction of the 0 to 3,000-cycle speech band at the output of the receiving end, some of which will reproduce that band straight and others inverted. The particular combination illustrated in FIG. 1 has the further advantage from a privacy standpoint in that the reentrant band is transmitted over the transmission line or other medium inverted.

In the privacy system of the invention shown in FIG. 1, only the essential apparatus required for producing the desired privacy operation has been shown. In a commercial system, the addition of a small amount of other transmission apparatus would result in some improved operation and elimination of distortion. For example, if the frequency ranges of the variable oscillator $O_2$ and the band-pass filter $F_3$ are properly selected, the same frequency may be utilized for the modulators $M_1$ and $M_3$, and $M_1'$ and $M_3'$, at each station, which frequency might be supplied from a common oscillator, thus reducing the amount of equipment required. Also, the different carrier frequencies supplied to the several modulators at each station may be supplied through individual selective filters, preferably of the crystal type, from a common harmonic generator. Other possible changes which might improve the operation of the system are the use in each privacy device of hybrid networks (coil or resistance) for coupling the parallel-connected two-wire branch circuits to the output of the low-pass filter $F_1$, $F_2'$ and to the input of the second modulator $M_2$, $M_2'$; the use of an attenuation pad in the two-wire branch circuits 1, 1' of sufficient value to compensate for the loss introduced by the modulator and high-pass filter in the other branch circuit 2, 2'; or the use in each of the branch circuits 1, 1' of an additional modulator supplied with a different carrier frequency from that supplied to the modulator in the other branch circuit 2, 2' and a following high-pass filter having a suitable cut-off, so as to provide frequency boosting in both branch circuits.

Other modifications of the circuits illustrated and described which are within the spirit and scope of the invention will occur to persons skilled in the art.

What is claimed is:

1. A privacy signaling system comprising a transmitting station and a receiving station connected by a wave transmission medium, said transmitting station comprising a source of signal waves to be transmitted and a signal translating device having input terminals connected to said source and output terminals connected to said medium, said receiving station comprising signal reproducing means and a signal translating device substantially identical with the signal translating device at the transmitting station, having its input terminals connected to said medium and its output terminals connected to said signal reproducing means, each of said translating devices comprising filtering means in its input for selecting a given band of frequencies from the input waves applied to its input terminals, means for producing from the selected band two contiguous frequency bands each carrying the intelligence of the selected band and varying in frequency in accordance with a predetermined secret code, synchronized at the two stations, means for selecting from the resulting wave a frequency band of width equal to that of said selected band including contiguous portions of said two contiguous frequency bands, means to shift the latter selected band to the same position in the frequency spectrum as the first selected band and to suply the frequency band so shifted to the output terminals of the device.

2. A system for communicating with privacy between stations connected by a wave transmission medium, comprising at a transmitting station a source of message waves and a wave translating circuit having input terminals connected to said source and output terminals connected to said medium, said translating circuit comprising filtering means in its input for selecting a frequency band of given width from the waves supplied to said input terminals, means for producing from the selected band two contiguous frequency bands each representing the intelligence of said selected band, having a constant combined width equal to twice that of said selected band and a position in the frequency spectrum varying in accordance with a secret code over a given frequency range, other filter means for selecting from the resulting wave a frequency band of width equal to that of the first selected band and including contiguous portions of said two contiguous frequency bands and means to shift the latter selected band to the position in the frequency spectrum occupied by said first selected band and to supply the said shifted band to said output terminals, and comprising at a receiving station message reproducing means and another translating circuit substantially identical with that at said transmitting station and operating in the same manner, having its input terminals connected to said medium and its output terminals connected to said message reproducing means, and means for synchronizing the contiguous frequency band producing means in the translating circuits at the two stations.

3. A communication system comprising two or more stations connected by a wave transmission medium, the transmitting circuits of each of said stations comprising a source of communication signal waves to be transmitted with privacy, a privacy translating device having input terminals connected to said source and output terminals connected to said medium, said privacy device comprising filtering means connected to its input terminals for selecting a given frequency band from the input waves, means including wave energy dividing, frequency shifting and filtering means for deriving from the selected frequency band two contiguous frequency bands each carrying the intelligence of said selected band, having a constant combined width equal to twice that of said selected band and a position in the frequency spectrum varying in accordance with a predetermined secret code over a frequency range equal in width to that of said selected band, other filtering means for selecting from the resulting wave a second frequency band having the same frequency width as the first selected band and containing contiguous portions of said two contiguous frequency bands, means for shifting said second selected band to the position in the frequency spectrum occupied by said first selected band, and means for supplying the resulting shifted band to said output terminals, and the receiving circuits of each of said stations comprising a communiaction signal reproducing device, and a privacy translating device identical with the privacy translating device in the transmitting circuit of each of the other associated stations and operating in the same manner, having its input circuit connected to said medium and its output circuit connected to said communication signal reproducing device.

4. The system of claim 3 in which said means in each privacy device for deriving said two contiguous frequency bands of varying frequency position comprises means for dividing said first selected frequency band into two energy portions each containing all of its component frequencies, means to modulate one of said energy portions with a carrier wave of a constant frequency equal to the upper limiting frequency of said first selected band, filter means for selecting the upper sideband of the resulting modulation products, means to superpose said upper sideband and the other (unmodulated) energy portion of said first selected band in a common circuit, and means in said common circuit for modulating the resultant wave with a carrier wave of a higher frequency varying in valve over a frequency range equal in width to that of said first selected band, and said frequency shifting means comprises means for modulating said second frequency band selected by said other filtering means with a carrier wave of a constant frequency equal to the lower limiting frequency of said second band selected by said other filtering means, the relative frequencies of the carrier waves supplied to the several modulating means in the privacy device in the transmitting circuit of each station being selected so as to enable accurate reproduction of the original communication signals by the privacy devices in the receiving circuit of the other stations with the use respectively of identical frequencies for the carrier waves supplied to the corresponding modulating means in the latter privacy devices, so as to allow two-way communication between the stations at the same frequencies.

5. A privacy device for connection between a telephone transmitter and a wave transmission medium, or between a wave transmission medium and a telephone receiver, for respectively producing from a voice message an unintelligible voice signal wave for transmission over said medium, or for reproducing an intelligible voice frequency message from such an unintelligible voice signal wave, comprising input terminals, filter means for selecting a restricted voice frequency band from the input waves supplied to said input terminals, two branch circuits respectively fed with equal energy portions of said selected frequency band, one of said branch circuits only including means for modulating the energy portion of said selected band fed thereto with a constant frequency wave of value equal to the upper limiting frequency of said selected band and a second filter means for selecting the upper sideband from the resulting modulation products, means for superposing the selected upper sideband output of said one branch circuit and the unmodulated band output of the other branch circuit in a common circuit to produce therein a frequency band of twice the width of the frequency band selected by the first-mentioned filter means, each half of which carries the intelligence of the latter frequency band, means for modulating the resulting wave with a wave of another higher frequency varying in value in accordance with a predetermined secret code over a frequency range having the same width as the voice frequency band selected by said first-mentioned filter means, a third filter means for selecting from the resulting modulation products half of the lower sideband, means for modulating the latter selected band with a wave of constant frequency of value equal to the lower limiting frequency of that band, to effectively shift the band to the position in the frequency spectrum occupied by the original voice frequency band selected by said first-mentioned filter means, and output terminals supplied with the resulting shifted frequency band.

References Cited by the Examiner

UNITED STATES PATENTS

| | | | |
|---|---|---|---|
| 1,571,010 | 1/26 | Kendall | 179—1.5 |
| 1,762,984 | 6/30 | Heising | 179—1.5 |

ROBERT H. ROSE, *Primary Examiner.*

NEWTON N. LOVEWELL, *Examiner.*